US010068676B2

United States Patent
Grandjean et al.

(10) Patent No.: US 10,068,676 B2
(45) Date of Patent: Sep. 4, 2018

(54) SUPPORTED MEMBRANE FUNCTIONALIZED WITH HEXA- AND OCTACYANOMETALLATES, PROCESS FOR THE PREPARATION THEREOF AND SEPARATION PROCESS USING SAME

(71) Applicants: COMMISSARIAT A L'ENERGIE ATOMIQUE ET AUX ENERGIES ALTERNATIVES, Paris (FR); CERAMIQUES TECHNIQUES ET INDUSTRIELLES (CTI), Salindres (FR); CENTRE NATIONAL DE LA RECHERCHE SCIENTIFIQUE, Paris (FR); UNIVERSITE DE MONTPELLIER 2, Montpellier (FR)

(72) Inventors: Agnes Grandjean, Saint Marcel de Careiret (FR); Yves Barre, Uchaux (FR); Eric Louradour, Saint-Ambroix (FR); Didier Dhaler, Tassin la Demi-Lune (FR); Yannick Guari, Prades-le-Lez (FR); Joulia Larionova, Prades-le-Lez (FR)

(73) Assignees: COMMISSARIAT A L'ENERGIE ATOMIQUE ET AUX ENERGIES ALTERNATIVES, Paris (FR); CERAMIQUES TECHNIQUES ET INDUSTRIELLES (CTI), Salindres (FR); CENTRE NATIONAL DE LA RECHERCHE SCIENTIFIQUE, Paris (FR); UNIVERSITE DE MONTPELLIER, Montpellier (FR)

( * ) Notice: Subject to any disclaimer, the term of this patent is extended or adjusted under 35 U.S.C. 154(b) by 489 days.

(21) Appl. No.: 14/430,737

(22) PCT Filed: Sep. 26, 2013

(86) PCT No.: PCT/EP2013/070056
§ 371 (c)(1),
(2) Date: Mar. 24, 2015

(87) PCT Pub. No.: WO2014/049048
PCT Pub. Date: Apr. 3, 2014

(65) Prior Publication Data
US 2015/0235721 A1 Aug. 20, 2015

(30) Foreign Application Priority Data
Sep. 28, 2012 (FR) .................................. 12 59228

(51) Int. Cl.
B01D 24/00 (2006.01)
B01D 39/00 (2006.01)
(Continued)

(52) U.S. Cl.
CPC ........... *G21F 9/12* (2013.01); *B01D 67/0093* (2013.01); *B01D 69/10* (2013.01); *B01D 71/024* (2013.01);
(Continued)

(58) Field of Classification Search
CPC .... B01D 67/00; B01D 7/0093; B01D 69/145; B01D 69/10; B01D 71/024;
(Continued)

(56) References Cited

U.S. PATENT DOCUMENTS 4,162,231 A 7/1979 Horwitz et al.
4,290,967 A 9/1981 Campbell et al.
(Continued)

FOREIGN PATENT DOCUMENTS

CN 101041123 A 9/2007
FR 2859924 A1 3/2005
(Continued)

OTHER PUBLICATIONS

Oji et al. (Development of prototype titanate ion exchange loaded-membranes (2008), 19 pages).*

(Continued)

*Primary Examiner* — Hayden Brewster
(74) *Attorney, Agent, or Firm* — Pearne & Gordon LLP

(57) ABSTRACT

A supported membrane is provided comprising an inorganic, solid porous filtration membrane supported by an inorganic, solid porous support, said supported membrane comprising nanoparticles of a metal coordination polymer with CN ligands comprising $M^{n+}$ cations, where M is a transition metal and n is 2 or 3; and $Alk^+_y[M'(CN)_m]^{x-}$ anions where Alk is an alkaline metal, y is 0, 1 or 2, M' is a transition metal, x is 3 or 4, and m is 6 or 8; said $M^{n+}$ cations of the coordination polymer being bound through an organometallic or coordination bond to an organic group of an organic (Continued)

graft chemically attached to the surface of the filtration membrane, inside the pores of the filtration membrane, and optionally inside the pores of the support. The supported membrane may be used in a process for separating at least one metal cation and solid particles from a liquid medium containing the same.

28 Claims, 5 Drawing Sheets

(51) Int. Cl.
| | |
|---|---|
| B01D 39/14 | (2006.01) |
| B01D 61/00 | (2006.01) |
| C02F 1/44 | (2006.01) |
| G21F 9/12 | (2006.01) |
| B01D 67/00 | (2006.01) |
| B01D 69/10 | (2006.01) |
| B01D 71/02 | (2006.01) |
| C02F 1/42 | (2006.01) |
| B01D 37/02 | (2006.01) |
| C03C 15/00 | (2006.01) |
| C03C 17/00 | (2006.01) |
| C09K 3/00 | (2006.01) |
| B01D 69/14 | (2006.01) |
| C02F 101/00 | (2006.01) |

(52) U.S. Cl.
CPC ........... C02F 1/42 (2013.01); C02F 1/444 (2013.01); B01D 69/145 (2013.01); B01D 2323/38 (2013.01); B01D 2325/42 (2013.01); C02F 2101/006 (2013.01)

(58) Field of Classification Search
CPC .............. B01D 2323/38; B01D 2325/42; B01D 24/00; B01D 37/02; B01D 39/00; B01D 39/04; B01D 39/06; B01D 39/14; B01D 61/00; B01D 67/0088; B01D 67/0093; B01D 69/02; B05D 1/38; B05D 3/00; B05D 3/10; B82Y 30/00; B01J 20/106; B01J 20/14
USPC ....... 65/399; 210/489, 500.1, 650, 681, 682; 210/688; 216/39; 252/184; 423/326; 427/244, 380; 501/154
See application file for complete search history.

(56) References Cited

U.S. PATENT DOCUMENTS

| | | | |
|---|---|---|---|
| 5,503,812 A | 4/1996 | Kirishima et al. | |
| 5,624,875 A * | 4/1997 | Nakanishi | B01J 20/103 501/12 |
| 6,596,173 B1 | 7/2003 | Chaufer et al. | |
| 9,786,398 B2 | 10/2017 | Grandjean et al. | |
| 2003/0099322 A1 | 5/2003 | Ozawa et al. | |
| 2004/0178141 A1 | 9/2004 | Vidal-Madjar et al. | |
| 2011/0290732 A1 | 12/2011 | Pacary et al. | |
| 2011/0306486 A1 | 12/2011 | Dussossoy et al. | |
| 2012/0103900 A1 * | 5/2012 | Bhave | G21F 9/125 210/643 |
| 2012/0125856 A1 | 5/2012 | Grandjean et al. | |
| 2012/0175316 A1 | 7/2012 | Goettmann et al. | |
| 2012/0318022 A1 | 12/2012 | Nonnet et al. | |
| 2013/0005958 A1 * | 1/2013 | Rensch | C07B 59/00 536/122 |
| 2013/0023713 A1 | 1/2013 | Labe et al. | |
| 2013/0319178 A1 | 12/2013 | Goettmann et al. | |

FOREIGN PATENT DOCUMENTS

| | | |
|---|---|---|
| GB | 2113252 A | 8/1983 |
| WO | 03018194 A1 | 3/2003 |
| WO | 2003018194 A1 | 3/2003 |
| WO | 2005040404 A1 | 5/2005 |
| WO | 2010133689 A2 | 11/2010 |

OTHER PUBLICATIONS

Abdel-Fattah, T., et al., "Heavy metal ions extraction from aqueous media using nanoporous silica", "Chemical Engineering Journal", Nov. 15, 2011, pp. 117-123, vol. 175.

Folch, B., et al., "Synthesis and behaviour of size controlled cyano-bridged coordination polymer nanoparticles within hybrid mesoporous silica", "New Journal of Chemistry", Nov. 12, 2007, pp. 273-282, vol. 32.

Oji, L., et al., "Development of prototype titanate ion-exchange loaded-membranes for strontium, cesium and actinide decontamination from aqueous media", "Journal of Radioanalytical and Nuclear Chemistry", Mar. 2009, pp. 847-854, vol. 279, No. 3.

Rao, S., et al., "Effective Removal of Cesium and Strontium from Radioactive Wastes Using Chemical Treatment Followed by Ultra Filtration", "Journal of Radioanalytical and Nuclear Chemistry", Nov. 2000, pp. 413-418, vol. 246, No. 2.

Zhang, C., et al., "Research on the treatment of liquid waste containing cesium by an adsorption-microfiltration process with potassium zinc hexacyanoferrate", "Journal of Hazardous Materials", Feb. 6, 2009, pp. 1057-1062, vol. 167.

Ivanchev, Sergi S. et al. "Polymer membranes for fuel cells: manufacture, structure, modification, properties" In: Russian Chemical Reviews, vol. 79, 2010, pp. 117-134 (English abstract only).

* cited by examiner

SUPPORTED MEMBRANE FUNCTIONALIZED WITH HEXA- AND OCTACYANOMETALLATES, PROCESS FOR THE PREPARATION THEREOF AND SEPARATION PROCESS USING SAME

CROSS-REFERENCE TO RELATED APPLICATIONS

This application is a U.S. national phase under the provisions of 35 U.S.C. § 371 of International Patent Application No. PCT/EP13/70056 filed Sep. 26, 2013, which in turn claims priority of French Patent Application No. 1259228 filed Sep. 28, 2012. The disclosures of such international patent application and French priority patent application are hereby incorporated herein by reference in their respective entireties, for all purposes.

TECHNICAL FIELD

The invention concerns a supported membrane functionalised by hexa- and octacyanometallates.

More specifically, the invention pertains to a supported membrane comprising an inorganic, solid, porous filter membrane supported by an inorganic solid, porous support, said filter membrane and optionally said support comprising nanoparticles of a cyano-bridged metal coordination polymer containing metal cations and hexa- and octacyanometallate anions, in particular hexacyanoferrate anions, said nanoparticles being bound via an organometallic or coordination bond to an organic graft chemically attached inside the pores of the inorganic, solid, porous filter membrane and optionally inside the pores of the inorganic, solid porous support.

The present invention also relates to a process for preparing said membrane.

The present invention also concerns a method for separating solid particles and metal cations, more specifically a method for filtering solid particles and extracting metal cations, especially radioactive metal cations, contained in a liquid using said membrane.

STATE OF THE PRIOR ART

Citations for documents [1]-[6] discussed below are provided in a REFERENCES section further below.

Nuclear plants such as power reactors, installations for treating spent nuclear fuel, laboratories, research centres and liquid waste treatment plants generate radioactive effluents.

These effluents of considerable volume must be treated and decontaminated before being discharged into the environment.

The pollutants contained in these effluents which are to be eliminated are chiefly solid particles and radioelements mostly present in the form of metal cations in solution.

In general, to treat these effluents it is necessary first to separate the solid particles by filtration and secondly to carry out selective extraction of the radioelements contained in these effluents e.g. solutions.

There are therefore two separate operations to be performed to remove all the pollutants, namely particles and radioelements contained in these effluents waste.

The processes currently used to treat such effluents therefore first apply a co-precipitation step to remove the solid particles, and also in some cases to entrain the cations of the radioelements to be decontaminated via selective co-precipitation, this step optionally being completed by a step using ion exchange resins to fix the radioelements.

Each of these steps entails disadvantages.

For the co-precipitation step, the amount of generated effluents is high and recovery of the particles after precipitation is a difficult operation.

For the radioelement fixation step, this is generally performed at the present time using organic ion exchange resins.

Such resins have at least two shortcomings. First their capacity is limited and second, on account of the irradiating nature of the extracted radioelements, these elements may in some cases lead to deterioration of the resins under storage conditions.

It is in in particular to overcome the defects of organic ion exchange resins that mineral binders were developed followed by composite binders. In this respect reference can be made to the prior art set forth in document WO-A2-2010/133689 [1].

Document WO-A2-2010/133689 [1] describes a solid nanocomposite material containing hexa- and octacyanometallates. More specifically, this document relates to a solid nanocomposite material comprising nanoparticles of a cyano-bridged metal coordination polymer comprising metal cations and hexa- and octacyanometallate anions, in particular hexacyanoferrate anions, said nanoparticles being bonded via an organometallic or coordination bond to an organic graft chemically attached inside the pores of a porous glass support e.g. in the form of beads.

This document also describes a method for fixing mineral pollutants such as inorganic cations e.g. radioactive caesium cations contained in a solution, using said material.

The examples of this document describe the fixing of caesium using grafted porous glass powders.

On completion of the fixation process, the pollutants in the solution are immobilised in the solid material, and the porosity of the material essentially consisting of glass can be closed by a treatment performed under mild conditions.

The solid material with closed porosity can be stored directly since the mechanical and chemical stabilities thereof permit such storage without the occurrence of any degradation.

The material of this document therefore allows a solution to be provided to the problem of insufficient resin capacity, but more especially to the problem of the future of the materials after extraction, of radioactive caesium in particular, since the porous glass support containing the radioactive Cs has closed porosity and can therefore be considered as a mere solid waste.

However, the material and process in this document essentially allow the fixing of metal cations and in no way the separating by filtration of the solid particles contained in an effluent, and in addition these materials are used in a method of column type thereby limiting treatment flow rates on account of head losses related to this method.

It is therefore necessary, as is usual, to have recourse to a prior separation step of the solid particles.

Document [2] describes the extraction of heavy metals, in particular the selective extraction of Hg(II) ions from aqueous media using micro-columns packed with nanoporous silica (NPSi) modified by thiol functions (NPSi—SH), more specifically with nanoporous silica modified on the surface by chemical immobilisation and bonding of 3-mercaptopropyl-trimethoxysilane.

However, the material of this document only allows the fixing, binding of metal cations and not the separation of solid particles contained in an effluent.

It is therefore necessary, as is usual, to have recourse to a prior step to separate the solid particles.

Document [3] concerns the incorporation of ion exchange titanate particles such as monosodium titanate and crystalline silicotitanate in organic inert, porous membranes.

It is indicated that these membranes allow the removal of caesium-133 and strontium-88 in solution in caustic, aqueous nuclear effluent.

The organic membranes used in this document may give rise to problems in terms of resistance under radiolysis.

Additionally, the titanates are scarcely selective for Cs and even for Sr, which leads to lowering of decontamination capacity when treating complex solutions.

Here again, the material of this document only allows the binding of metal cations and not the separation of solid particles contained in an effluent.

It is therefore necessary, as is usual, to have recourse to a prior separation step of the solid particles.

Document [4] concerns a process for removing caesium and strontium from radioactive effluent using chemical treatment via precipitation with calcium phosphate or copper ferrocyanide followed by ultrafiltration.

Document [5] relates to a method for removing caesium from an aqueous solution via adsorption on particles of the adsorbent $K_2Zn_3[Fe(CN)_6]$ followed by microfiltration. More exactly, the adsorbent is added to a solution of sodium nitrate under agitation for one hour and then filtered through a microfiltration membrane.

In documents [4] and [5], a first decontamination step is therefore performed via chemical co-precipitation or adsorption treatment, followed by a second separate step of membrane filtration.

The second step is used to separate the particles which adsorbed the radioelements during the first chemical treatment step.

The processes in documents [4] and [5] use two separate, different technologies in series.

The coupling of these technologies leads in particular to complexification of these processes requiring the use of several items of equipment, increases the size of the installations, multiplies transfer of materials and fluid circulation circuits and is difficult to implement in practice.

In addition, this coupling does not necessarily increase the efficacy of decontamination.

In the light of the foregoing there is therefore a need for a material and process which, with great efficacy and in a limited number of simple steps, allow the simultaneous separation of solid particles and metal cations, in particular radioactive metal cations, contained in a liquid.

It is the goal of the invention inter alia to meet this need.

A further goal of the invention is to provide such a material and such a process which does not have the disadvantages, defects, limitations and shortcomings of prior art materials and processes such as set forth above, and which brings a solution to the problems raised by the prior art materials and processes.

DESCRIPTION OF THE INVENTION

This goal, and others, are achieved according to the invention by a supported membrane comprising an inorganic, solid, porous filtration membrane supported by an inorganic, solid, porous support, said supported membrane comprising nanoparticles of a metal coordination polymer with CN ligands ("cyano-bridged metal coordination polymer") comprising $M^{n+}$ cations, where M is a transition metal and n is 2 or 3; and $Alk^+_y[M'(CN)_m]^{x-}$ anions, where Alk is an alkaline metal, y is 0, 1, or 2, M' is a transition metal, x is 3 or 4, and m is 6 or 8; said $M^{n+}$ cations of the coordination polymer being bound through an organometallic or coordination bond to an organic group of an organic graft chemically attached to the surface of the filtration membrane, inside the pores of the filtration membrane, and optionally inside the pores of the support.

Said nanoparticles can also optionally be called « nanocrystals ».

By attached "inside the pores" is generally meant "attached onto the inner surface of the walls of the channels defining said pores".

Advantageously, Alk may be K.

Advantageously, $M^{n+}$ may be $Fe^{2+}$, $Ni^{2+}$, $Fe^{3+}$, $Co^{2+}$, $Cu^{2+}$ or $Zn^{2+}$.

Advantageously, M' is $Fe^{2+}$ or $Fe^{3+}$ or $Co^{3+}$ and m is 6; or else M' is $Mo^{5+}$ and m is 8.

Advantageously, the $[M'(CN)_m]^{x-}$ anions may be $[Fe(CN)_6]^{3-}$, $[Fe(CN)_6]^{4-}$, $[Co(CN)_6]^{3-}$ or $[Mo(CN)_8]^{3-}$ anions.

Advantageously, the $M^{n+}$ cations may be $Ni^{2+}$, $Cu^{2+}$, $Fe^{2+}$ or $Fe^{3+}$ cations and the anions may be $[Fe(CN)_6]^{3-}$ or $[Fe(CN)_6]^{4-}$ anions.

Advantageously, the $M^{n+}$ cations may be $Fe^{3+}$ cations and the anions may be $[Mo(CN)_8]^{3-}$ anions.

Advantageously, the cations may be $Co^{2+}$ or $Ni^{2+}$ cations and the anions may be $[Co(CN)_6]^{3-}$ anions.

Advantageously, the nanoparticles are of spherical or spheroidal shape.

The nanoparticles generally have a size e.g. a diameter of 3 nm to 30 nm.

It is to be noted that the nanoparticles of the coordination polymer are generally of uniform size and shape throughout the entire membrane and optionally the support.

Advantageously, the organic group may be selected from among nitrogen-containing groups such as pyridine and amines; oxygen-containing groups such as acetylacetonates and carboxylates; and phosphorus-containing groups such as phosphonates.

Advantageously, the membrane may consist of at least one metal or metalloid oxide.

Preferably, said oxide is selected from among $Al_2O_3$, $SiO_2$, $ZrO_2$, $TiO_2$ and mixtures thereof.

Advantageously, the support may consist of a material selected from among metal oxides, metalloid oxides and mixtures thereof, such as $TiO_2$, $ZrO_2$, $Al_2O_3$, $SiO_2$, $Y_2O_3$, CaO, MgO, and mixtures thereof; metal carbides, metalloid carbides such as SiC, and mixtures thereof; silicates such as the compounds of mullite type (aluminium silicate) and cordierite type (aluminous ferro-magnesium silicate), and mixtures thereof; metal titanates such as tialite (aluminium titanate), metalloid titanates and mixtures thereof; and mixtures thereof.

Advantageously, the filtration membrane has a thickness of 0.1 to 100 µm, preferably 2 µm to 50 µm.

Advantageously, the filtration membrane is a multilayer system, in other words the membrane comprises several layers e.g. 2 to 10 layers.

The filtration membrane may be a microfiltration membrane with a mean pore size of 2 to 0.1 µm, an ultrafiltration membrane with a mean pore size of 1 nm to 100 nm e.g. 10 nm to 100 nm, or a nanofiltration membrane with a mean pore size of less than 1 nm.

Advantageously, the filtration membrane may have a specific surface area of 0.1 $m^2/g$ to 300 $m^2/g$.

Advantageously, the porosity of the porous filtration membrane is 10% to 80% by volume. This porosity is generally measured by nitrogen adsorption or by mercury porosimetry for microfiltration membranes.

The filtration membrane may be a planar membrane and the support a planar support, or else the membrane may be a tubular membrane preferably with circular or polygonal cross-section, and the support may also be a tubular support, preferably of circular or polygonal cross-section, e.g. square or hexagonal, surrounding said membrane.

Advantageously, the support may be a block or monolith having the shape of a cylinder of revolution wherein one or more channels are defined, generally of circular or polygonal cross-section, parallel to the axis of said cylinder, the inner wall of this channel or of these channels being coated with an inorganic layer forming one or more tubular filtration membranes.

The membrane of the invention has a specific structure and composition and can be defined as a nanocomposite, supported inorganic, solid, porous filtration membrane comprising nanoparticles of a metal coordination polymer with CN ligands, said nanoparticles being bound through an organometallic or coordination bond to an organic group of an organic graft chemically attached to the surface of the filtration membrane, inside the pores of the filtration membrane and optionally inside the pores of the support.

In other words, the supported membrane of the invention comprises nanoparticles of a coordination polymer with CN ligands (cyano-bridged coordination polymer particles) based on metal cyanometallate such as metal hexa- and octacyanometallates building blocks, repeat units (patterns), unit cells, which are linked, bound to an organic group of a graft, said graft being immobilised, chemically attached, generally by covalence, to the surface of the filtration membrane, inside the pores of the filtration membrane, and optionally inside the pores of the support.

It may be said that the supported membrane of the invention is a supported membrane prepared by growing networks with CN ligands (cyano-bridged networks) at the surface of the filtration membrane, inside the pores of the filtration membrane and optionally inside the pores of the support, at specific points thereof, this growth being obtained by successive coordination of $M^{n+}$, and then of $[M'(CN)_m]^{x-}$, possibly repeated basis.

It can also be said that the polymer is a $Mn^+/Alk^+_y[M'(CN)_m]^{x-}$ polymer.

The polymer is a so-called «coordination» polymer since it sets up a link, bond between the $M^{n+}$ cations e.g. $M^{2+}$, and $M'^{3+}$ cations for example, via CN ligands: $M^{2+}$—CN-$M'^{3+}$.

The M/M' atomic ratio is generally close to 1.

By "chemically attached" is generally meant that the graft is bound, attached, fixes, by a covalent bond to the surface of the filtration membrane, inside the pores of the filtration membrane and optionally inside the pores of the support.

The organic group, which may be described as a functional group for anchoring nanoparticles, is a group capable of forming an organometallic bond with the $M^{n+}$ cation.

This group can be selected from among nitrogen-containing groups and oxygen-containing groups. Preferred groups are the pyridine group and bidentate diamine groups such as the akylenediamine groups, for example the ethylene diamine group —NH—$(CH_2)_2$—$NH_2$.

The graft generally comprises a linker group such as a straight-chain alkylene group having 2 to 6 carbon atoms e.g. —$(CH_2)_2$— group linking said organic group, also called functional anchoring group, to a group ensuring chemical attachment of the graft, in general by covalence, to the surface of the filtration membrane, inside the pores of the filtering membrane and optionally inside the pores of the support.

For a membrane or support of which the surface consists essentially of silica, this group ensuring the covalent attachment of the graft is a SiO group, for example, bound to the silanol groups of the surface of the membrane or support.

For a membrane or support of which the surface consists essentially of oxides of $TiO_2$ or $ZrO_2$ type, this group ensuring the covalent attachment of the graft is a phosphonate group, for example, bound to the hydroxyl groups of the surface of the membrane or of the support.

According to the invention, the metal cyanometallate such as a transition metal hexacyanoferrate is obtained by successive crystallizations and it is bound by a strong organometallic bond (or coordination bond) to the organic group or functional anchoring group of the graft; it then adheres perfectly to the membrane and optionally to the support through the graft that is strongly, chemically attached by covalence to this membrane.

The supported membrane of the invention differs in particular from the solid membrane described in document [1] which consists essentially of a support (in said document the term "support" does not have the same meaning as in the present invention) made of porous glass which is unable to ensure any filtering function.

In addition, there is no mention or suggestion in document [1] that the material of this document is able to form a filtration membrane and is able to be arranged on a support.

The man skilled in the art knows that a filtration membrane is fully different through its shape and structure from a mere support made of porous glass, and will immediately identify the differences which can exist between the supported membrane of the invention and the porous glass support such as mentioned in document [1].

The terms "membrane" and "filtration" imply de facto a certain number of intrinsic characteristics which are in no way those of a support made of porous glass.

The supported membrane of the invention does not have the disadvantages of the prior art materials, meets the needs and requirements listed above and provides a solution to the problems raised by the prior art materials.

The supported membrane of the invention, for the first time, associates in one and the same entity the filtering function of solid particles ensured by the membrane and the extraction fixing, binding function of metal cations ensured by the nanoparticles of the metal coordination polymer with CN ligands (cyano-bridged metal coordination polymer).

The supported membrane of the invention allows the filtration to be obtained of solid particles contained in liquids such as solutions, simultaneously coupled with the extraction fixing, binding of metal cations such as caesium cations contained in these liquids by means of the functionalization of the inorganic filtration membrane and optionally of the inorganic support.

The supported filtration membrane of the invention, for the first time, allows the capturing, binding, fixing of cations which was not possible up until now with any inorganic membrane.

The membrane of the invention also allows a significant increase in the extraction kinetics of the cations compared with porous glass which can only be used in a column. The membrane of the invention is generally used in cross-flow filtration which allows increased flow rates and prevents clogging.

A support of porous glass type, used in a column (or cartridge) process, is more similar to a dead-end filter with constant porosity over its entire thickness and with pore sizes smaller than a few µm.

A process implemented on a column or fixed bed using porous glass for example is less conducive to permeability and generally leads to non-negligible head loss.

A membrane with asymmetric porous structure such as the membrane of the invention allows a significant reduction in head losses and hence allows increased filtering and decontamination rates. The permeation rate is therefore high which implies faster extraction speed.

According to the invention, the membrane and its support are inorganic membranes and supports.

The advantages of inorganic membranes and supports inter alia are high heat resistance, high chemical resistance both to organic solvents and to harsh chemical compounds such as acids, bases and oxidants, high mechanical strength allowing the use of high pressures, and high resistance to radiations. Chemical and radiation resistance are then determined by the graft and hexacyanoferrate attached onto the inorganic filter membrane and support. These entities are chemically resistant at pH values below 11 and their resistance to radiolysis is equally good.

In the membrane of the invention there is no metal cyanometallate such as a transition metal hexacyanoferrate that is free within the porosity and which could be released for example during treatment of a solution for the removal of mineral pollutants.

The supported membrane of the invention generally comprises an amount of bound metal cyanometallate e.g. metal hexacyanoferrate of 1% to 10% by weight, preferably 2% to 3% by weight relative to the weight of the membrane when the cyanometallates are solely attached to the surface of the pores of the membrane, or relative to the weight of the membrane and support when the cyanometallates are attached to the surface of the pores of the membrane and of the support, this value to be compared with the mean value of 10% by weight for the silica impregnated hexacyanoferrates of the prior art.

To conclude by using filtration membranes as grafting support, in addition to the metal cation extracting property, and in particular the selective extracting property of caesium cations ensured by the hexacyanoferrate nanoparticles, the membranes of the invention which are generally selected in relation to the size of their macropores in the case of microfiltration MF membranes or ultrafiltration UF membranes, also simultaneously allow the filtering of solid particles contained in the liquid such as a solution to be treated.

Through the use firstly of an inorganic system and of a complexant which is known to be highly selective for caesium in particular, it is possible to treat liquids such as solutions that are both diverse and complex regarding their composition, their concentration, their pH (e.g. lower than 11) and any radiolysis they may have undergone.

The invention further concerns a process for preparing the supported membrane described above wherein the following successive steps are carried out:

a) a supported membrane is provided comprising an inorganic, solid porous filtration membrane supported on an inorganic, solid porous support;

b) the organic graft is chemically attached to the surface of the filtration membrane, inside the pores of the filtration membrane, and optionally inside the pores of the support;

c) the inorganic solid porous filtration membrane, to the surface of which and inside the pores of which the organic graft is attached, and the inorganic solid porous support inside the pores of which the organic graft is optionally attached, are contacted with a solution containing the $M^{n+}$ ion, and then the supported membrane thus obtained is washed one or more times;

d) the supported membrane obtained at the end of step c) is contacted with a solution of a complex of $[M'(CN)_m]^{x-}$;

e) the supported membrane obtained at the end of step d) is washed one or more times;

f) optionally steps c) to e) are repeated.

Advantageously, the chemical attaching of the organic graft to the surface of the filtration membrane, inside the pores of the filtration membrane, and optionally inside the pores of the support, may be obtained by contacting the porous filtration membrane and the porous support with a solution such as a solution in water or methanol of $_2$(EtO)—(P=O)—(CH$_2$)$_2$—NH—(CH$_2$)$_2$—NH$_2$.

Advantageously, the solution containing the $M^{n+}$ ion may be a solution, in a solvent selected from among water, alcohols such as methanol, and mixtures thereof, of one or more salts containing the $M^{n+}$ ion.

Preferably, said solution is an aqueous solution i.e. the solvent of which consists solely of water.

Said solution may also be a solution such as a solution in methanol, e.g. of $M(BF_4)_n$.

Advantageously, the complex of $[M'(CN)_m]^{x-}$ meets the following formula:

(Cat)$_x$[M'(CN)$_m$], where M', m, and x have the meaning already given above, and Cat is a cation generally selected from among alkaline metal cations such as K or Na, ammoniums, quaternary ammoniums such as tetrabutylammonium ("TBA") and phosphoniums such as tetraphenylphosphonium ("PPh$_4$").

Preferably, the solution of a $[M'(CN)_m]^x$ complex is an aqueous solution.

Preferably the washings are conducted with water, ultrapure water in particular.

Advantageously, steps c) to e) may be repeated 1 to 4 times.

To conclude, this process is simple, has recourse to known, proven processes and is reliable and fully reproducible i.e. it allows the preparation of an end product of which the characteristics, composition and properties are perfectly determined and do not undergo any random variations.

In this process, nanoparticles of hexacyanoferrates are grown at the surface of the filtration membrane, inside the pores of the filtration membrane, and optionally inside the pores of the support of this membrane. This allows ensured good attaching of nanoparticles selective for metal cations such as Cs at the surface of the filtration membrane, inside the pores of the filtration membrane and optionally inside the pores of the support, and the obtaining of all types of desired hexacyanoferrates, and with control over the size of the hexacyanoferrate nanoparticles.

The invention also concerns a method for separating at least one metal cation and solid particles from a liquid medium containing the same, wherein a stream of the liquid medium is contacted with a first face (side) of the supported membrane, such as described above, opposite the support, a pressure difference is applied between (across) the two opposite faces of the supported membrane, whereby a first portion of the stream of liquid medium passes through the supported membrane, is collected on the second face of the supported membrane and forms a permeate depleted in metal cation and in solid particles; a second portion of the stream of liquid medium does not pass through the supported membrane, is collected on the first face of the supported membrane and forms a retentate enriched in solid particles; and the metal cation is immobilised at the surface of the inorganic solid porous filtration membrane inside the pores of the inorganic solid porous filtration membrane and optionally inside the pores of the inorganic solid porous support.

Advantageously the pressure difference applied between the two opposite faces of the supported membrane is 0.1 to 6 bars, preferably 0.5 to 3 bars for microfiltration MF and ultrafiltration UF membranes, and it is in the order of 10 bars for a nanofiltration membrane NF.

Advantageously, said liquid medium may be an aqueous liquid medium such as an aqueous solution.

Said liquid medium may be a processing liquid or industrial effluent.

Advantageously, said liquid medium may be selected from among liquids and effluents derived from the nuclear industry and nuclear plants, and from activities using radionuclides.

In general, said cation may be present at a concentration of 0.1 picogram to 100 mg/L, preferably 0.1 picogram to 10 mg/L.

The term « metal » also covers isotopes and in particular radioactive isotopes of said metal.

Preferably the cation is a cation of an element selected from among Cs, Co, Ag, Ru, Fe and Tl and the isotopes, particularly the radioactive isotopes, thereof.

More preferably, the cation is a cation of $^{134}$Cs or $^{137}$Cs.

The size of the solid particles is generally between 0.1 μm and 10 μm.

In general, said solid particles are inorganic particles, in particular particles of metal oxides or metalloid oxides.

Preferably, the stream of liquid medium is placed in contact with the first surface of the supported membrane, circulating parallel to said surface i.e. cross-flow filtration of the stream of liquid medium is carried out.

This method has all the advantages intrinsically related to the supported membrane of the invention that is used in this method, and already described above.

The use of the functionalised membranes according to the invention allows the immobilising, fixing, of metal cations, and in particular Cs cations, and simultaneously the separation of solid particles.

The wavelength (in cm$^{-1}$) is plotted along the X-axis and Transmittance (%) along the Y axis.

Figure 7:
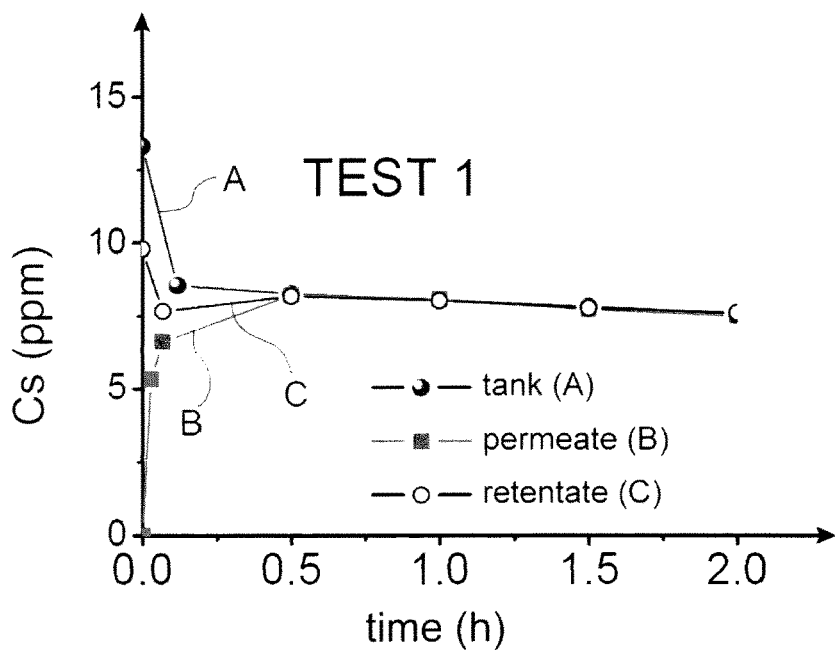

FIG. 7 is a graph showing the change as a function of time of the extracted caesium concentration in the permeate (B), the retentate (C), and the tank (A) during filtration tests of ultrapure water containing caesium nitrate at a concentration of 0.1 mMol/L (13 ppm) conducted in an experimental pilot filtration installation.

The tests (Example 2) were performed with a supported membrane of the invention, namely a TiO$_2$ membrane on TiO$_2$/Al$_2$O$_3$ support, functionalised by nanoparticles of copper hexacyanoferrate (membrane prepared in Example 1).

The Cs concentration (in ppm) is plotted along the Y-axis and time (in hours) along the X-axis.

Figure 8:
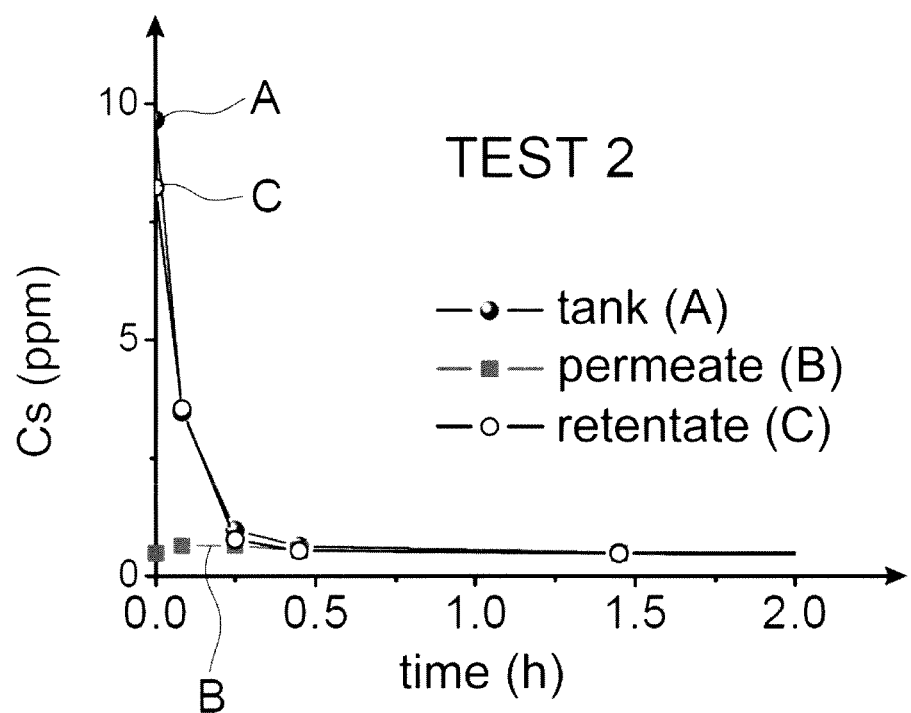

FIG. 8 is a graph showing the change as a function of time in the concentration of extracted caesium in the permeate (B), the retentate (C) and the tank (A) during filtration tests of ultrapure water containing caesium nitrate at a concentration of 0.1 mMol/L (13 ppm) using a supported membrane of the invention, namely a TiO$_2$ membrane on TiO$_2$/Al$_2$O$_3$ support, functionalised by nickel hexacyanoferrate nanoparticles, in a pilot experimental filtration installation (Example 4).

The Cs concentration (in ppm) is plotted along the Y-axis and time (in hours) along the X-axis.

DETAILED DESCRIPTION OF PARTICULAR EMBODIMENTS

The invention is described in more detail below with particular reference to the process for preparing the supported membrane according to the invention.

The first step of the process consists of providing an inorganic, porous membrane, supported on an inorganic, solid porous support.

By membrane is generally meant an object or part in the form of a layer defined by two generally parallel main surfaces. A membrane can be considered to be a selective barrier forming an interface between the fluid to be treated and purified and the treated, purified fluid.

It is further specified that the term « porous » such as used herein in relation to the membrane or membrane support, means that this support contains pores or voids.

As a result, the density of this porous membrane or of this porous support is lower than the theoretical density of a non-porous membrane or non-porous support which can then be termed as a solid membrane or solid support.

The pores can be linked or isolated but in the porous membrane and the porous support of the invention the majority of pores are linked, in communication. In this case the term open porosity is used or of interconnected pores.

In general, in the porous membrane and porous support of the invention, the pores are percolating pores which connect a first main surface of said membrane or of said support with a second main surface generally parallel to said first main surface, of said membrane or said support.

In the meaning of the invention, a membrane or support is generally considered to be porous when it has a density of no more than about 95% of its theoretical density.

In general, the porosity of the filtration membrane is 10% to 80% by volume, preferably 25% to 50% by volume.

This porosity is generally measured by nitrogen adsorption, or mercury porosimetry for microfiltration membranes.

The porosity of the support can generally range from 10% to 50% by volume, preferably 25% to 50% by volume.

The thickness of the filtration membrane is generally 0.1 to 100 μm, preferably 2 μm to 50 μm.

The mean size of the pores of the filtration membrane, which is their mean diameter for pores of circular cross-section, is generally chosen in relation to the size of the solid particles contained in the liquid such as a solution to be treated that it is desired to separate.

Thus, the filtration membrane may be a microfiltration membrane with a mean pore size of 2 to 0.1 µm, for example 0.1 µm, 0.2 µm, 0.45 µm or 0.8 µm; an ultrafiltration membrane having a mean pore size of 1 nm to 100 nm, for example 10 nm to 100 nm corresponding to a cut-off threshold of 300 to 1 kDa, for example 15, 50, 150, or 300 kDa; or a nanofiltration membrane with a mean pore size of less than 1 nm.

The filtration membrane may only comprise a single layer but it generally comprises several layers, for example 2 to 10 layers.

Thus, a microfiltration membrane generally comprises 1 to 4 layers.

This filtration membrane, e.g. an ultrafiltration membrane, generally has an asymmetric structure with a pore size decreasing from the support towards the active surface in contact with the liquid to be filtered.

The membrane may have a specific surface area of 1 to 500 m$^2$/g, preferably 5 to 150 m$^2$/g measured by nitrogen adsorption, or by mercury porosimetry for microfiltration membranes.

The support generally has a larger pore size than the membrane. The mean size of the support pores is generally 1 to 15 µm, ideally 4 to 6 µm.

The support may have a specific surface area of 1 to 500 m$^2$/g, preferably 1 to 100 m$^2$/g measured by nitrogen adsorption or mercury porosimetry for microfiltration membranes.

According to the invention, the membrane and its support are inorganic membranes and supports.

The advantages of inorganic membranes and supports have already been set forth above.

The filtration membrane may consist of at least one metal or metalloid oxide.

Preferably, said oxide is selected from among $Al_2O_3$, $SiO_2$, $ZrO_2$, $TiO_2$ and mixtures thereof.

Advantageously, the support may consist of a material selected from among metal oxides, metalloid oxides and the mixtures thereof such as $TiO_2$, $ZrO_2$, $Al_2O_3$, $SiO_2$, $Y_2O_3$, CaO, MgO, and the mixtures thereof; metal carbides, metalloid carbides such as SiC, and the mixtures thereof; silicates such as compounds of mullite type (aluminium silicate) and cordierite type (aluminous ferro-magnesium silicate), and the mixtures thereof; metal titanates such as tialite (aluminium titanate), metalloid titanates and their mixtures; and mixtures thereof.

Preferably, the support consists of $TiO_2$, of $Al_2O_3$ or a mixture thereof, and the membrane consists of $ZrO_2$, of $TiO_2$ or a mixture thereof.

The membrane may assume various shapes.

The membrane may be a planar membrane i.e. it is in the form of a plate in which case the support is also planar, or else the membrane may be a tubular membrane i.e. it is in the shape of a tube.

This tube may have a straight (constant) cross-section in the form of a circle (straight cylinder), ellipse, polygon e.g. a triangle, hexagon or square.

The tubular membrane is surrounded by a support which is also tubular.

The support may be a block or monolith the shape of which is generally a cylinder of revolution in which several channels are defined of straight cross-section, generally circular or polygonal e.g. triangular, square or hexagonal parallel to the axis of said cylinder.

The inner wall of this channel or these channels is coated over its entire surface with an inorganic layer which forms one or more tubular membranes.

Membranes which are particularly suitable for the invention are the membranes available from Orelis Environnment under the trade name Kleansep®.

These are support-forming ceramic monoliths which comprise channels of which the inner surfaces are provided with a membrane coating.

Table 1 below gives the characteristics of the Kleansep membranes which can be used in the invention.

TABLE 1

| CHARACTERISTICS | |
|---|---|
| Support: | Monoliths: $TiO_2$—$Al_2O_3$ |
| Diameter/Length | 25 mm/1178 mm |
| Number of channels: | 7-8-19-31-52 |
| Diameter of channels: | 6-4.8-3.5-2.9-2.2 mm |
| Membrane: | $ZrO_2$/$TiO_2$ |
| Pressure resistance: | 80 bars |
| Duty pressure: | 10 bars |
| pH range: | 0-14 |
| Sterilisation: | 121° C. |
| Temperature limit: | Up to 150° C. |

These membranes can be sterilised with oxidants and they are insensitive to solvents and radiations.

They can be used for microfiltration, ultrafiltration or nanofiltration.

The steps now described for the chemical attaching of the organic graft and preparation of the nanoparticles of a cyano-bridged coordination polymer that are bound to these grafts on the surface of the filtration membrane inside the pores of the filtration membrane and optionally inside the pores of the support, are substantially similar to those of the procedure described in the document by Folch et al. [6] and in document WO-A2-2010/133689 [1], with the difference however that in these documents the porous support used is not a membrane or optionally a membrane support, but a specific porous support in mesoporous silica or porous glass respectively, and also with the difference that according to the invention these steps, this grafting, can be performed in dynamic mode for example directly within the installation for implementing the separation method described below, for example a pilot filtration installation allowing greater chemical binding capacity.

Reference can therefore be made to these documents regarding the reagents and operating conditions in particular that are used for these steps, but also for the description of the nanoparticles and their binding onto the surface of the pores via the graft.

At a first step, the chemical binding is performed of the organic graft, also called organic complex, onto the surface of the filtration membrane, inside the pores of the filtration membrane and optionally inside the pores of the support.

Figure 1:
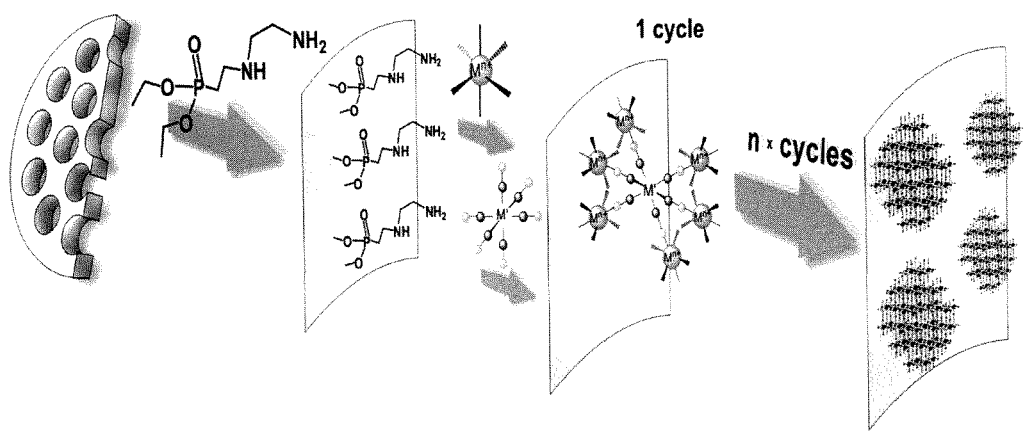
FIG. 1 is a schematic illustration of the process of the invention, performed with (OEt)$_2$-(P=O)—(CH$_2$)$_2$—NH—(CH)$_2$—NH$_2$ grafts.
Figure 2:
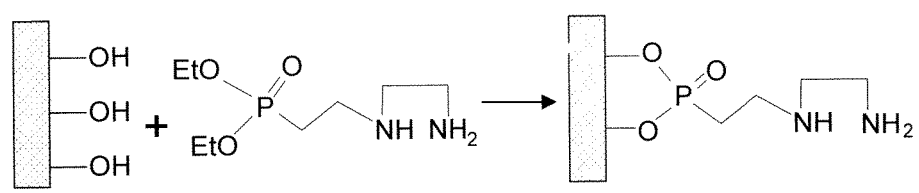
FIGS. 2 and 3 are other schematic illustrations of the process of the invention performed with (OEt)$_2$-(P=O)—(CH$_2$)$_2$—NH—(CH)$_2$—NH$_2$ grafts.

This step can also be called a functionalization step (see FIGS. 1 and 2).

In other words, during this first step the organic complex is grafted onto the surface of the filtration membrane, inside the pores of the filtration membrane and optionally inside the pores of the support. The organic graft comprises an organic group that can be called a functional nanoparticle anchoring group.

A functional nanoparticle anchoring group is a group able to form an organometallic or coordination bond with the $M^{n+}$ cation, in other words a group capable of complexing the $M^{n+}$ cation.

Examples of such organic groups have already been cited above.

Particular mention can be made of nitrogen-containing organic groups, oxygen-containing organic groups and phosphorus-containing organic groups.

A preferred organic group is the bidentate diaminoethylene group as shown in FIGS. 1 and 2.

The organic group, functional anchoring group, can be bonded directly to the surface of the filtration membrane, inside the pores of the filtration membrane, and optionally inside the pores of the support, but it is generally chemically attached to the surface of the filtration membrane, inside the pores of the filtration membrane and optionally inside the pores of the support via a binding group that is attached, chemically bonded, generally via a covalent bond, to the surface of the filtration membrane, inside the pores of the filtration membrane and optionally inside the pores of the support.

The graft therefore comprises an organic group, also called functional anchoring group, and a group ensuring the covalent binding of the graft to the surface of the filtration membrane, inside the pores of the filtration membrane, and optionally inside the pores of the support.

In general, the functional anchoring group and the binding group of the organic graft are linked by an arm, a linker group such as a straight-chain alkylene group having 2 to 6 carbon atoms, such as a —$(CH_2)_2$— group (see FIGS. 1 and 2).

The group ensuring the covalent binding of the graft can be selected from among silane groups such as the trialkoxysilane groups, e.g. triethoxysilane or trimethoxysilane groups, and from among phosphonate groups such as the dialkylphosphonate groups e.g. diethylphosphonate (See FIGS. 1 and 2).

Figure 3:
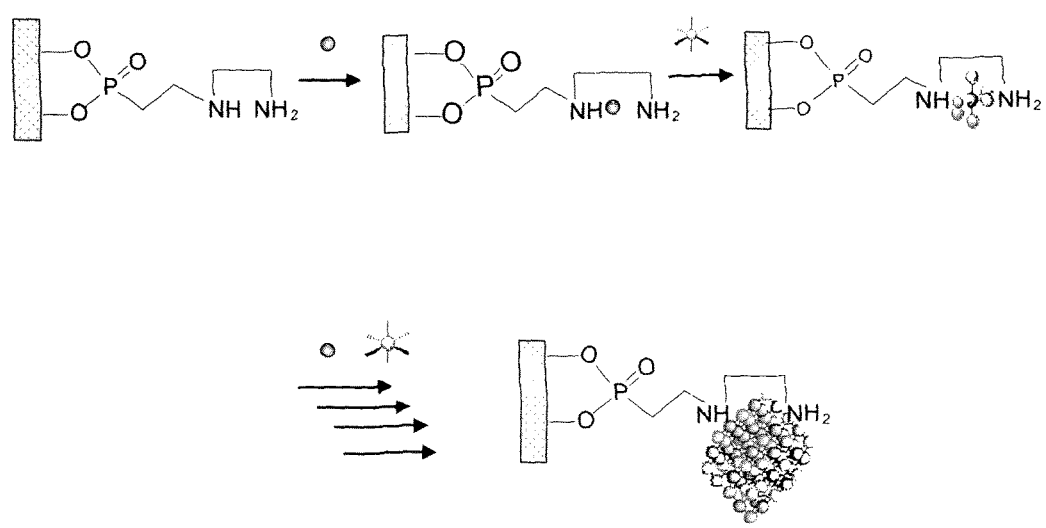

The silane and phosphonate groups allow the covalent binding of the graft by reacting with the hydroxyl groups generally existing on the surface of the filtration membrane, inside the pores of the membrane and inside the pores of the support. The bond between the surface of the filtration membrane, the inner surface of the pores of the filtration membrane and optionally the inner surface of the pores of the support, with the graft is then a —O—Si bond or —O—P bond as illustrated in FIGS. 1, 2 and 3.

For a filtration membrane of which the surface and inner surface of the pores consist essentially of silica, or a support of which the inner surface of the pores consists essentially of silica, the group ensuring the covalent binding of the graft reacts with the silanol groups on the surface of the membrane, on the inner surface of the filtration membrane and optionally with the silanol groups on the inner surface of the support.

For a membrane of which surface and inner surface of the pores consist essentially of titanium and/or zirconium oxides, or a support of which the inner surface of the pores consists essentially of titanium and/or zirconium oxides, binding is preferably obtained with the help of a phosphonate group allowing therefore the use of aqueous solutions during the grafting step.

To obtain fixing, attachment of the graft at the surface of the filtration membrane, inside the pores of the filtration membrane, and optionally inside the pores of the support, this membrane and this membrane support are placed in contact with a compound (for simplification the term graft is used to designate this compound both before binding and after binding) comprising said functional anchoring group, an attachment group capable of chemically binding generally by covalence to the surface of the filtration membrane, inside the pores of the filtration membrane, and optionally inside the pores of the support, and optionally a linking group connecting, linking said functional anchoring group to the attachment group.

As has already been seen, this binding group can be selected from among trialkoxysilane groups or dialkylphosphonate groups which react with the hydroxyl groups which may be present on the surface of the filtration membrane, inside the pores of the filtration membrane, and inside the pores of the support.

In general, contacting is obtained by placing the supported membrane (namely the filtration membrane on the support) in contact with a solution of said compound comprising a functional anchoring group, an attachment group and optionally a linking group in a solvent.

It is therefore possible to contact the membrane and the membrane support with a solution of bidentate amine phosphonate (see FIG. 2) or for pyridine with a solution of $(CH_3O)_3Si(CH_2)_2C_5H_4N$ in a solvent.

One preferred solvent for the bidentate amine phosphonate is distilled or ultrapure water, and a preferred solvent for $(CH_3O)_3Si(CH_2)_2C_5H_4N$ is toluene.

Contacting can be performed in dynamic mode i.e. the membrane and the membrane support are contacted with a stream of the solution of the compound circulating in a closed circuit.

Or else contacting can be performed in «static mode». For example, the membrane and membrane support are placed in a vessel containing the solution and the solvent under reflux.

The contact time is generally 4 to 96 hours, e.g. 96 hours in «dynamic mode», and 12 to 48 hours e.g. 24 hours in «static mode».

After contacting, the membrane is generally rinsed e.g. with distilled or ultrapure water, for example for a time of 1 hour, this time being the same in dynamic mode and static mode.

On completion of this first step, a filtration membrane is therefore obtained functionalized by organic groups such as ethylene diamine groups (see FIG. 2), and optionally a support functionalised by said organic groups.

In a second step, nanoparticles of a metal coordination polymer with CN ligands (cyano-bridged metal coordination polymer) are caused to grow at the surface of the filtration membrane, inside the pores of the filtration membrane, and optionally inside the pores of the membrane support.

This growth is performed in two successive steps, optionally repeated.

Initially the filtration membrane, at the surface of which and inside the pores of which the organic graft is attached, and the support inside the pores of which the organic graft is optionally attached, are contacted with a solution containing the $M^{n+}$ ion, generally in the form of a metal salt (see FIGS. 1 and 3).

This solution is a solution in a solvent generally selected from among water, alcohols such as methanol, and the mixtures thereof, for example mixtures of water and one or more alcohols.

The preferred solvent is ultrapure water.

The metal salt contained in this solution is a salt the metal of which is generally selected from among metals able to give a cyanometallate of this metal, such as a hexacyanoferrate of this metal, which is insoluble.

This metal can be selected from among all transition metals e.g. copper, cobalt, zinc, nickel, iron etc. The $M^{n+}$ ion can then be selected from among $Fe^{2+}$, $Ni^{2+}$, $Fe^{3+}$, $Co^{2+}$, $Cu^{2+}$ and $Zn^{2+}$ ions.

The metal salt may for example be a nitrate, sulfate, chloride, acetate, tetrafluoroborate, optionally hydrated, of one of these metals M.

For example it may be a copper tetrafluoroborate for the case in FIG. 3.

The concentration of metal salt in the solution is preferably 0.01 to 1 mol/L, more preferably 0.01 to 0.05 mol/L.

The amount of salt used is preferably about 0.1 to 1 mmol/g of treated membrane and optionally treated membrane support.

Advantageously, the solution containing the $M^{n+}$ ion may be a solution in water or in alcohol such as methanol, or a solution in a mixture of water and one or more alcohols.

Advantageously, this solution containing the $M^{n+}$ ion may be a solution such as a solution in methanol of $[M(H_2O)_6]Cl_2$ where M is preferably Ni, Fe or Co, or of $[M(H_2O)_6]Cl_3$ where M is Fe, or a solution of $M(BF_4)_2$ where M is Cu for example.

The contacting, that can also be termed impregnating of the membrane and of the membrane support, is generally conducted at ambient temperature, and for a time of generally 4 to 96 hours.

This contacting can be performed in static mode, preferably under agitation, in which case it generally lasts a time of 12 to 96 hours, or else in dynamic mode in which case it generally lasts 4 to 24 hours.

On completion of this contacting, a membrane and membrane support are obtained in which $M^{n+}$ cations are attached via an organometallic or coordination bond to the functional anchoring groups of the graft.

Therefore, if ethylenediamine is used (see FIGS. 1 and 3), a bond is formed between one of the nitrogen atoms and the $M^{n+}$ cation (see FIGS. 1 and 3), and if pyridine is used a bond is set up between the nitrogen of the ring and the $M^{n+}$ cation.

When contacting is completed, the membrane and membrane support are generally removed from the solution.

In dynamic mode, the membrane and membrane support are not removed from the solution but washing is performed directly for a given time e.g. for 1 h.

Next, the membrane and membrane support are washed one or more times, for example 1 to 3 times, preferably using the same solvent as the solvent in the $M^{n+}$ solution, such as water or methanol.

This washing operation allows the removal of excess metal salt and the obtaining of a stable product with perfectly determined composition.

The membrane and membrane support which have reacted with the metal cation $M^{n+}$ as described above are then contacted with a solution of a complex (which could optionally be called a salt) of $Cat_x[M'(CN)_m]^{x-}$, for example $K_x[M'(CN)_m]^{3-}$ (see FIGS. 1 and 3).

This solution is a solution in a solvent selected from among water, alcohols, and the mixtures thereof, for example mixtures of water and one or more alcohols.

The preferred solvent is ultrapure water.

The contacting which can also be termed impregnating of the membrane and membrane support, is generally conducted at ambient temperature and generally lasts 2 to 96 hours.

This contacting can be conducted in static mode, preferably under agitation, in which case it generally lasts a time of 12 to 96 hours, or else in dynamic mode in which case it generally lasts a time of 2 to 24 hours.

The complex generally meets the following formula:

$(Cat)_x[M'(CN)_m]$, where M', m and x have the meaning already given above, and Cat is a cation generally selected from among the cations of alkaline metals Alk such as K or Na, ammonium cation, quaternary ammoniums such as Tetrabutylammonium («TBA»), and phosphonium cations such as tetraphenylphosphonium («$PPh_4$»). Preferred complexes are the complexes of formula $K_x[M'(CN)_m]$.

Other complexes that can be used are the complexes of formula $[N(C_4H_9)_4]_x[M'(CN)_m]$, such as the complexes of formula $[N(C_4H_9)_4]_3[M'(CN)_m]$ for example $[N(C_4H_9)_4]_3[Fe(CN)_6]$, $[N(C_4H_9)_4]_3[Mo(CN)_8]$ and $[N(C_4H_9)_4]_3[Co(CN)_6]$.

The solution, for example aqueous solution, of complex or salts is used at variable concentration i.e. the concentration of the salt or complex is generally 0.001 to 1 mol/L, preferably 0.001 to 0.05 mol/L.

In addition, the solution of salt or complex of $Cat_y[M'(CN)_m]^{x-}$ used is generally prepared so that the weight ratio of salt or complex to the quantity of impregnation support formed by the initial membrane and the membrane support is preferably 0.1 to 5 mmol/g of membrane support.

In this manner the binding is obtained of the anionic part $[M'(CN)_m]^{x-}$ e.g. $[Fe(CN)_6]^{4-}$, of the salt or complex on the $M^{n+}$ cations (see FIGS. 1 and 3), this binding occurring by formation of bonds of covalent type which are relatively strong depending on the medium, and this binding is generally quantitative i.e. all the $M^{n+}$ cations react. Binding is therefore in no way random.

After this contacting, the membrane and membrane support are generally removed from the solution. However this is not necessary in dynamic mode.

The membrane and membrane support are then washed one or more times, for example 1 to 3 times, preferably with the same solvent as the solvent in the solution of salt or complex e.g. methanol or ultrapure water.

The objective of this washing operation is to remove the $[M'(CN)_m]^{x-}$ salts and complexes which have not been attached onto the $M^{n+}$ cations, and allows a membrane to be obtained in which there is no longer any free, non-bonded $[M'(CN)_m]^{x-}$ which could be released.

The succession of steps to contact the membrane and membrane support with the $M^{n+}$ metal cation and of washings (one or more times) followed by contacting of the membrane and membrane support with a solution of a $[M'(CN)_m]^x$ salt or complex, for example $[M'(CN)_m]^3$, and washing (one or more times) can be carried out only once or else it can be repeated, generally 1 to 10 times, for example 1 to 4 or 5 times (see FIGS. 1 and 3); it is therefore possible to obtain perfect adjustment of the nanoparticle size.

The weight content of mineral binder i.e. of insoluble metal hexacyanoferrate attached onto the anion exchange polymer, is generally 1 to 10%, for example 3% relative to the weight of the membrane and optional membrane support.

The supported membrane of the invention can be used in particular, but not exclusively, in a method for separating at least one metal cation and solid particles from a liquid medium in which they are contained, wherein a stream of the liquid medium is placed in contact with a first face of the supported membrane, such as described above, opposite the support, a pressure difference is applied between the two opposite faces of the supported membrane, whereby a first portion of the stream of liquid medium passes through the supported membrane, is collected on the second face of the supported membrane and forms a permeate or filtrate depleted in metal cations and solid particles; a second portion of the stream of liquid medium does not pass through the supported membrane, is collected on the first face of the supported membrane and forms a retentate or concentrate enriched in solid particles; and the metal cation is immobilised inside the pores of the inorganic, solid porous membrane and optionally of the inorganic, solid porous support.

The process of the invention has all the advantages inherent in the use therein of the supported membrane of the invention. Most of these advantages have already been set forth above.

With the process of the invention it is possible in a single step, a single simple operation performed solely with the supported membrane of the invention, to carry out the simultaneous separation of metal cations and solid particles, whereas with the prior art processes it was necessary to conduct two separate, successive operations in different devices to separate the solid particles and metal cations respectively.

The process of the invention does not therefore have the disadvantages of the prior art processes and provides a solution to the problems raised by the prior art processes.

The membranes of the invention, through their excellent properties in terms of binding metal cations, such as excellent exchange capacity, excellent selectivity, high reaction speed, and in terms of filtration of solid particles, are particularly suitable for use in such a process.

This excellent efficiency of cation binding is obtained with reduced quantities of mineral binder, fixer such as insoluble hexacyanoferrate.

Liquid media such as solutions, in particular aqueous solutions, which can be treated using the method of the invention and with the supported membrane of the invention are most varied and for example may even contain corrosive agents, acids or other owing to the excellent chemical stability of the membrane of the invention.

The supported membrane of the invention can be used in particular over a very broad pH range. For example, aqueous nitric solutions can be treated having a concentration ranging from 0.1 to 3 M for example, and acid or neutral solutions up to pH 11, etc.

The cation able to be grafted in the process of the invention may be any metal cation. In general this metal cation is in dissolved form in the liquid medium such as a solution.

The term «metal» also covers the isotopes and in particular the radioactive isotopes of said metal.

Preferably the cation is a cation of an element selected from among Tl, Fe, Cs, Co, Ru, Ag and the isotopes, in particular radioactive isotopes, thereof, amongst which mention can be made of $^{58}$Co, $^{60}$Co, $^{55-59}$Fe, $^{134}$Cs, $^{137}$Cs, $^{103,105,105,107}$Ru. The metal cation is the caesium Cs$^+$ cation in particular, and more particularly the cations $^{134}$Cs$^+$ and $^{137}$Cs$^+$ or Thallium Tl$^{2+}$.

One preferred use of the supported membrane of the invention is therefore the fixation of radioactive caesium which contributes to a large part of the gamma activity of nuclear industry liquids and is selectively immobilised, fixed, by hexacyanoferrates.

The concentration of the cation(s) may vary within very board limits: for example, for each thereof, it may range from 0.1 picogram to 100 mg/L, preferably from 0.01 mg/L to 10 ng/L.

The solid particles generally have a size of 0.1 µm to 10 µm and they may be of any shape.

The size of the membrane pores is chosen in relation to the size of these particles so that they can be retained by the membrane.

The composition of the solid particles is dependent on the effluent to be treated and may be extremely varied.

In general, said solid particles are inorganic particles in particular particles of metal or metalloid oxides e.g. iron, nickel, manganese oxides, etc.

The solution to be treated with the process of the invention is preferably an aqueous solution which, in addition to the cation(s) to be fixed and the solid particles, may contain other salts in solution such as NaNO$_3$ or LiNO$_3$ or Al(NO$_3$)$_3$ or any other soluble salt of an alkaline or alkaline-earth metal at a concentration possibly reaching 2 moles/L. As indicated above, the solution may also contain acids, bases and even organic compounds.

The solution to be treated may also be a solution in a pure organic solvent such as ethanol (absolute alcohol), acetone or other, in a mixture of these organic solvents, or in a mixture of water and one or more of these water-miscible organic solvents.

The membrane of the invention has therefore the advantage of being able to treat solutions which cannot be treated with organic resins.

This solution may be a processing liquid or industrial effluent or other, possibly derived from the nuclear industry and nuclear plants or any other nuclear-related activity.

Among the various liquids and effluents of the nuclear industry, nuclear plants and activities using radionuclides which can be treated using the process of the invention, mention can be made for example of nuclear plant cooling waters, and any of the various effluents coming into contact with radioisotopes such as all washing waters, resin regenerating solutions etc.

Evidently, however, the process of the invention can also be used in other fields of activity, whether or not industrial, non-nuclear.

For example, hexacyanoferrates selectively bind to thallium and this property could be put to advantage for treating effluents from cement plants to reduce or eliminate discharges and emissions of this element which is a violent poison.

To implement the process of the invention, a dead-end filtration technique can be used but preference is given to cross-flow filtration which limits the phenomenon of accumulation of solid particles on the surface of the membrane, since the circulation of the retentate or concentrate causes strong turbulence in the vicinity of the membrane. In addition, with this type of filtration it is possible to treat major quantities of solution continuously with a high flow rate thereof.

For cross-flow filtration, planar or tubular membranes can be used.

The contact time of the liquid medium to be treated with the supported membrane of the invention is variable, and for example may range from 1 minute to 10 hours, in particular from 10 minutes to 1 hour, for continuous operation.

After this separation procedure, the metal cations contained in the solution are immobilised at the surface of the filtration membrane, inside the pores of the filtration membrane, and optionally inside the pores of the support via sorption i.e. via ion exchange or adsorption within the nanoparticles, within the structure of the nanoparticles, themselves chemically attached onto the surface of the pore walls of the membrane and optionally of the support.

After extraction of the cations such as Cs cations and separation of the particles, the filtration membrane and its support since they are both of inorganic type, form waste compatible with the cementing industry even with vitrification if the activity of the filtration membrane and its support is too high.

The collected permeate or filtrate is depleted of metal cations and solid particles.

This depletion of metal cations is dependent on the initial concentration of metal cations and the quantity of effluent to be treated. It cannot be quantified in advance: in general, in particular regarding radioactive liquid waste, a Decontamination Factor (DF) is set which then determines the time of use of the membrane in relation to the concentration of the effluents to be treated.

The retentate or concentrate collected is enriched with solid particles.

The remark made above regarding depletion similarly applies to this enrichment which is dependent on the initial concentration of solid particles and on the quantity of effluent to be treated. It cannot be quantified in advance.

When treating radioactive effluents, the permeate can even be a fully decontaminated solution (with the desired DF) and can therefore be discharged into the environment.

Figure 4:
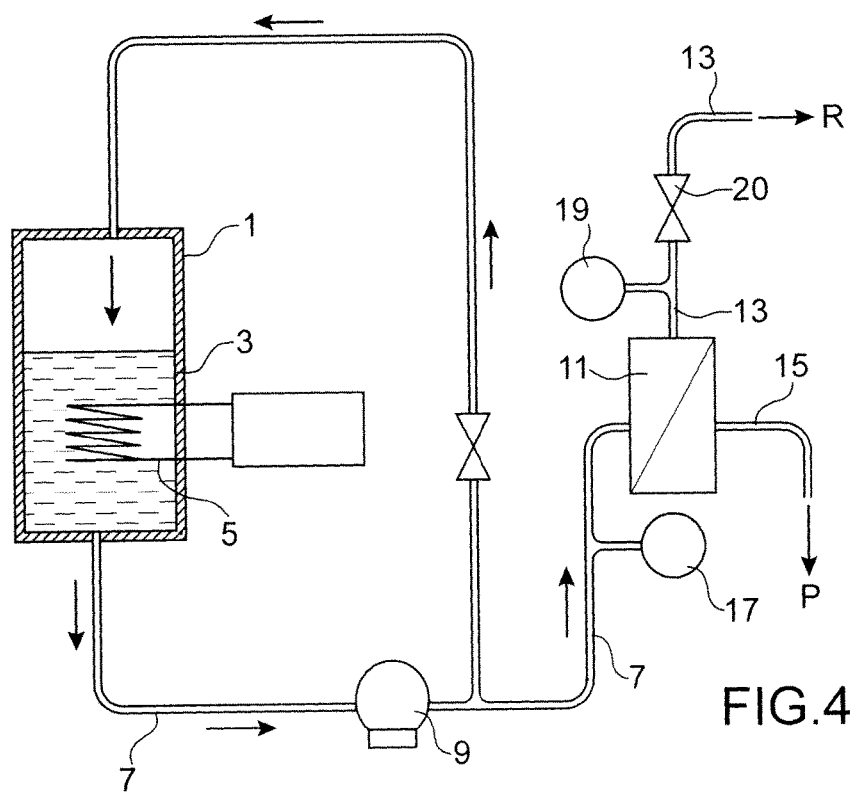
FIG. 4 is a schematic view of an installation for implementing the separation process of the invention.

The retentate no longer contains polluting cations but contains particles in suspension. It can be considered to be chemical waste and no longer radiological waste. The membrane is inorganic radiological waste and can be transferred towards conventional waste disposal outlets such as cementing or vitrification, or it can be directly placed in storage. FIG. 4 illustrates a cross-flow filtration installation for implementing the separation method of the invention, which comprises a tank 1 containing the effluent 3 to be treated and which can be held at an appropriate temperature by a cryostat 5.

The effluent to be treated is fed from a tank 1, via a pipe 7 fitted with a pump 9, into the filtration module 11 from which the retentate R is drawn via a pipe 13 and the permeate via a pipe 15. The pipes 7 and 13 are equipped with manometers 17 and 19 and pipe 13 is equipped with a valve 20.

Figure 5:
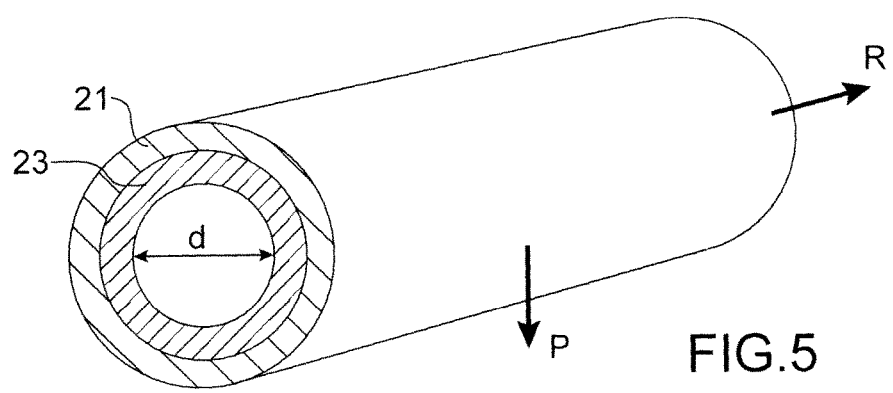
FIG. 5 is a schematic view of a tubular supported membrane capable of being used in the installation in FIG. 4.

In the filtration device or module 11, one or more tubular supported membranes can be used such as illustrated in FIG. 5, or else one or more monoliths such as described above.

FIG. 5 gives a perspective view of a tubular supported membrane comprising a support 21 in inorganic material, coated with a layer of inorganic membrane 23.

The inner diameter d of the tube is 10 mm for example, the thickness of the inorganic membrane layer 23 may be 2 to 50 μm and the thickness of the support may be 3 mm. With tubes of this type the effluent to be treated is caused to flow inside the tube; the retentate R is collected at the outlet of the tube and the permeate P on the periphery of the tube.

An assembly of tubes of this type or an assembly of monoliths such as described above can be mounted as is conventional in a chamber between two end plates or flanges which, together with the chamber, determine an inlet space for the effluent and a collection space for the retentate, the permeate being collected in the chamber.

Such modules are marketed in particular by ORELIS Environment under the trade name Module Kleansep™ K01, K03, K07, K19, K37, K99.

A description of the invention will now be given with reference to the following illustrative examples which are non-limiting.

EXAMPLES

In following Examples 1 to 4:
a membrane of the invention was synthesized by grafting, in water, a graft with phosphonate group onto a $TiO_2$ membrane on $TiO_2/Al_2O_3$ support, followed by growth in methanol of nanoparticles of copper hexacyanoferrate in said grafted membrane (Example 1);

tests to extract caesium from a solution of caesium nitrate were then performed using the membrane prepared in Example 1 (Example 2).

a membrane of the invention was synthesized by grafting, in water, a graft with phosphonate group onto a$TiO_2$ membrane on $TiO_2/Al_2O_3$ support, followed by growth in water of nanoparticles of nickel hexacyanoferrate in said grafted membrane (Example 3).

tests to extract caesium from a solution of caesium nitrate were then performed using the membrane prepared in Example 3 (Example 4).

Example 1

Grafting, in water, of a graft with phosphonate group onto a $TiO_2$ membrane on $TiO_2/Al_2O_3$ support, followed by the growth in methanol of nanoparticles of copper hexacyanoferrate in said grafted membrane.

Experimental Device

The device, assembly, used for grafting the graft with phosphonate group onto the membrane—in other words for functionalization of the membrane—then for growth of the nanoparticles, comprised a chromatography column in which the membrane was arranged. The top of the column was connected at its base via an external flexible tube on which a peristaltic pump was positioned ensuring circulation of liquid in a closed circuit within the column.

Using this device it was possible to perform grafting of the graft followed by growth of the nanoparticles in dynamic mode to promote insertion of the nanoparticles.

Once the membrane was in place in the device, the volume of liquid it could contain was 60 mL.

The membrane used was a single-channel microfiltration $TiO_2$ membrane on $TiO_2/Al_2O_3$ support, having a porosity of 0.2 μm and membrane specific surface area in the order of 0.2 m²/g.

Grafting of the Graft with Phosphonate Group:

The graft with phosphonate group was a bidentate amine phosphonate of formula $_2(EtO)$—(P=O)—$(CH_2)_2$—NH—$(CH_2)_2$—$NH_2$.

The grafting of this bidentate amine phosphonate was conducted in ultrapure water.

The weight of the membrane used including the support was 35.5 g and for grafting a graft weighing 0.657 g was used.

This graft was diluted in 60 mL of ultrapure water. Once the supported membrane was in place in the device, assembled for grafting in dynamic mode as described above, the solution of graft in water was caused to circulate in this device for 4 days.

After this grafting step, the membrane and its support were washed in ultrapure water for 1 hour.

Growth of the Nanoparticles:

60 mL of a first solution of $Cu(BF_4)_2$ at a concentration of $10^{-2}$ mol/L in methanol was added to the device, assembled for grafting in dynamic mode as described above.

This solution circulated in the device for at least 2 hours. Washing in pure methanol was then carried out for 1 hour.

60 mL of a second solution of $TBA_3Fe(CN)_6$ at a concentration of $10^{-2}$ mol/L in methanol were the added to the grafting device in dynamic mode as described above.

This solution circulated in the system for at least 2 hours. Washing in pure methanol was then carried out for at least 1 hour.

This complete impregnation cycle which comprises two contacting steps of the membrane with different solutions, each of these contacting steps being followed by a washing step, was repeated 4 times.

Finally, washing with water was performed for at least 2 hours.

Characterization of the Membrane after Functionalization:

After the 5 functionalization cycles, in other words after the growth of the nanoparticles, the functionalized supported membrane changes colour and becomes reddish, which is the sign of the presence of copper hexacyanoferrate. This change in colour of the membrane after functionalization is clearly apparent when it is placed next to a blank, non-functionalized membrane which is white in colour.

The functionalized membrane prepared as described above was analysed under infrared and for comparison purposes a "white" non-functionalized membrane.

Figure 6:
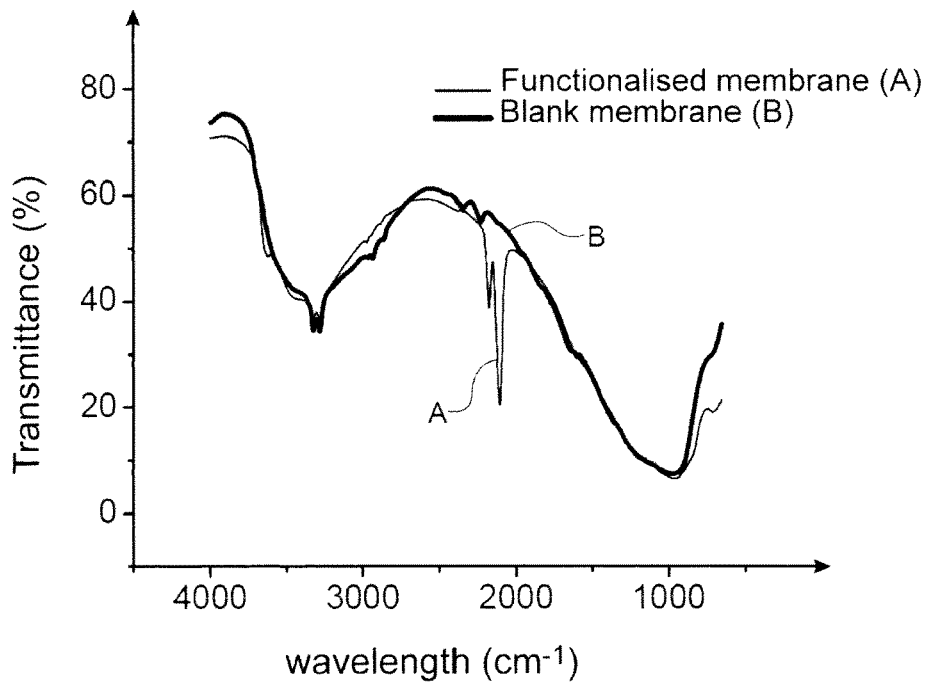
FIG. 6 is a graph showing the infrared spectrum of a membrane made of TiO$_2$ on a support made of TiO$_2$/Al$_2$O$_3$ functionalised by copper hexacyanoferrate nanoparticles (A), and the infrared spectrum of a membrane made of TiO$_2$ on a blank TiO$_2$/Al$_2$O$_3$ support, non-functionalised by copper hexacyanoferrate nanoparticles («blank« membrane) (B) (Example 1).

The infrared spectra obtained are shown in FIG. 6.

When the IR spectrum of the functionalized membrane is compared with the IR spectrum of the blank membrane, the presence of a peak at 2100 cm$^{-1}$ is seen in the IR spectrum of the functionalized membrane, whereas this peak does not exist in the IR spectrum of the blank membrane. The existence of this peak confirms the presence of nanoparticles of copper hexacyanoferrate within the membrane.

Example 2

Caesium extraction tests from an aqueous solution of caesium nitrate using the membrane prepared in Example 1.

In this example, extraction, binding tests of the caesium contained in an aqueous solution of caesium nitrate were performed using the membrane prepared in Example 1.

These tests were performed in a pilot filtration installation.

This pilot installation was similar to the installation illustrated in FIG. 4 with the difference however that the outlet pipe 13 (R), and outlet pipe 15 (P) were redirected towards the tank 1 for loop operation mode for this feasibility test.

This installation functioned in cross-flow and comprised:
- a tank containing the solution to be treated (volume used in the order of 1 L). This tank was double-walled and thermostat-controlled to maintain a constant temperature;
- a circulation and pressurising pump. The discharge of the pump was connected to the inlet of the membrane whilst its suction was connected to the base of the tank.
- a retentate outlet of the membrane connected to the top of the tank via piping on which a manometer was positioned indicating the operating pressure downstream of the membrane. For these tests the pressure used was 1 bar.
- a permeate outlet of the membrane, also connected to the tank via piping provided with a 3-way valve.

The functionalized membrane prepared in Example 1 was tested in dynamic mode in the pilot filtration installation with 900 mL of ultrapure water containing caesium nitrate, at an initial concentration of 0.1 mMol/L (i.e. about 13 ppm).

The test was carried out continuously for 2 hours.

At the start and end of the test, and regularly throughout the test, samples of permeate, retentate and tank solution were taken and analysed to determine their concentration of caesium.

The results of the analyses are given in FIG. 7 and in following Table 2:

TABLE 2

Initial and final concentrations of caesium in the tank solution and adsorption capacity of the membrane.

| Initial concen. (ppm) | Final concen. (ppm) | Volume of the solution (L) | Weight of membrane (g) | Cs in membrane (ppm) |
| --- | --- | --- | --- | --- |
| 13.32 | 7.48 | 0.9 | 35.5 | 148 |

It follows from Table 2 that the functionalized membrane of the invention allows the extraction of Cs.

FIG. 7 shows the trend in the amount of extracted Cs as a function of the time elapsed since the start of the test, in the permeate, retentate and tank.

It appears that after ½ hour, equilibrium is reached and the Cs concentration is identical in the permeate, retentate and tank.

This means that the caesium is bound onto the membrane as expected.

It also appears that the permeate during the first instants of the test does not contain any caesium.

Example 3

Grafting, in water, of a graft with phosphonate group onto a TiO$_2$ membrane on TiO$_2$/Al$_2$O$_3$ support, followed by growth in water of nanoparticles of nickel hexacyanoferrate in said grafted membrane.

In this example, the grafted nanoparticles differed from those in Example 1, and the solvent used for growth of these nanoparticles differed from the solvent used in Example 1.

The device, the experimental assembly used was the same as for Example 1.

The membrane used was identical to the membrane used in Example 1, namely a single-channel, microfiltration TiO$_2$ membrane on TiO$_2$/Al$_2$O$_3$ support, having a porosity of 0.2 μm and membrane specific surface area in the order of 0.2 m$^2$/g.

Grafting of the Graft with Phosphonate Group:

This step was performed in the same manner as in Example 1.

Growth of Nanoparticles:

60 mL of a first solution of nickel sulfate at a concentration of 10$^{-2}$ mol/L in ultrapure water were added to the device, assembled for grafting in dynamic mode as described above.

This solution circulated in the device for at least 2 hours. Washing with ultrapure water was then conducted for 1 hour.

60 mL of a second solution of potassium ferrocyanide at a concentration of 10$^{-2}$ mol/L in ultrapure water were then added to the grafting device in dynamic mode as described above.

This solution circulated in the system for at least 2 hours. Washing in ultrapure water was then carried out for at least 1 hour.

This complete impregnation cycle which comprises two contacting steps of the membrane with different solutions, each of these contacting steps being followed by a washing step, was repeated 4 times. Finally, washing in water was conducted for at least 2 hours.

Characterization of the Membrane after Functionalization

The functionalized membrane prepared as described above was analysed under infrared and, as comparison, a blank non-functionalized membrane.

When the IR spectrum of the functionalized membrane is compared with the IR spectrum of the blank membrane, the presence of a peak at 2100 cm$^{-1}$ is seen in the IR spectrum of the functionalized membrane characteristic of CN bonds, whereas this peak does not exist in the IR spectrum of the blank membrane. The existence of this peak confirms the presence of nickel hexacyanoferrate nanoparticles within the membrane.

Example 4

Caesium extraction test from an aqueous solution of caesium nitrate using the membrane prepared in Example 3.

In this example two extraction, binding tests were performed of the caesium contained in an aqueous solution of caesium nitrate using the membrane prepared in Example 3.

These tests were performed in the pilot installation already described above.

The functionalized membrane prepared in Example 3 was tested in dynamic mode in the pilot filtration installation with 900 mL of ultrapure water containing caesium nitrate at an initial concentration of 10 ppm.

A first test (Test 1) was conducted continuously for 2 hours.

At the start and end of the test, and regularly throughout the test, samples were taken of the permeate, retentate and tank solution and analysed to determine their caesium concentration.

The test was repeated a second time (Test 2) with 900 mL of ultrapure water containing caesium nitrate, at an initial concentration of 10 ppm, since during the first test all the Cs had been adsorbed.

The results of the analyses are given in following Table 3 and FIG. 8 for Continuous Test 1:

TABLE 3

Initial and final concentrations of caesium in the tank solution and membrane adsorption capacity

| Test | [Cs] initial (ppm) | [Cs] final (ppm) | Volume of solution (L) | Weight of membrane (g) | Cs in membrane (ppm) |
|---|---|---|---|---|---|
| Continuous 1 | 9.66 | 0.51 | 0.9 | 35.5 | 232 |
| Continuous 2 | 9.55 | 4.2608 | 0.9 | 35.5 | 134 |
| | | | | | 366 |

The membrane prepared in Example 3 allows Cs extraction with a capacity of 366 mg of Cs captured per 1 kg of membrane.

From a kinetics viewpoint, as shown by the curves in FIG. 8, Cs extraction is very fast, in the order of ½ hour in the retentate and immediate in the permeate.

REFERENCES

[1] WO-A2-2010/133689.
[2] Abdel-Fattah, T. M., S. M. S. Haggag, et al. (2011), "*Heavy metal ions extraction from aqueous media using nanoporous silica*", Chemical Engineering Journal 175: 117-123.
[3] Oji, L. N., K. B. Martin, et al. (2009), "*Development of prototype titanate ion-exchange loaded-membranes for strontium, cesium and actinide decontamination from aqueous media*", Journal of Radioanalytical and Nuclear Chemistry 279(3): 847-854.
[4] Rao, S., B. Paul, et al. (2000), "*Effective Removal of Cesium and Strontium from Radioactive Wastes Using Chemical Treatment Followed by Ultra Filtration*", Journal of Radioanalytical and Nuclear Chemistry 246(2): 413-418.
[5] Zhang, C. P., P. Gu, et al. (2009), "*Research on the treatment of liquid waste containing cesium by an adsorption-microfiltration process with potassium zinc hexacyanoferrate*", Journal of Hazardous Materials 167(1-3): 1057-1062.
[6] Folch, B., Guari et al., "*Synthesis and behaviour of size controlled cyano-bridged coordination polymer nanoparticles within hybrid mesoporous silica*", (2008), New Journal of Chemistry, Vol. 32, Number 2, 273-282.

What is claimed is:

1. A supported membrane comprising an inorganic solid porous filtration membrane supported by an inorganic solid porous support, said supported membrane further comprising nanoparticles of a metal coordination polymer with CN ligands comprising $M^{n+}$ cations, where M is a transition metal and n is 2 or 3; and $Alk^+_y[M'(CN)_m]^{x-}$ anions, where Alk is an alkaline metal, y is 0, 1, or 2, M' is a transition metal, x is 3 or 4, and m is 6 or 8; said $M^{n+}$ cations of the coordination polymer being bound through an organometallic or coordination bond to an organic group of an organic graft chemically attached to an outer surface of the filtration membrane, inside the pores of the filtration membrane and optionally inside the pores of the support.

2. The supported membrane according to claim 1 wherein $M^{n+}$ is $Fe^{2+}$, $Ni^{2+}$, $Fe^{3+}$, $Co^{2+}$, $Cu^{2+}$ or $Zn^{2+}$.

3. The supported membrane according to claim 1 wherein M' is $Fe^{2+}$ or $Fe^{3+}$ or $Co^{3+}$ and m is 6; or M' is $Mo^{5+}$ and m is 8.

4. The supported membrane according to claim 1 wherein $[M'(CN)_m]^{x-}$ is $[Fe(CN)_6]^{3-}$, $[Fe(CN)_6]^{4-}$, $[Co(CN)_6]^{3-}$ or $[Mo(CN)_8]^{3-}$.

5. The supported membrane according to claim 1 wherein the $M^{n+}$ cations are $Ni^{2+}$, $Cu^{2+}$, $Fe^{2+}$ or $Fe^{3+}$ cations and the anions are $[Fe(CN)_6]^{3-}$ or $[Fe(CN)_6]^{4-}$ anions.

6. The supported membrane according to claim 1 wherein the cations are $Fe^{3+}$ cations and the anions are $[Mo(CN)_8]^{3-}$ anions.

7. The supported membrane according to claim 1 wherein the cations are $Co^{2+}$ or $Ni^{2+}$ cations and the anions are $[Co(CN)_6]^{3-}$ anions.

8. The supported membrane according to claim 1 wherein the nanoparticles are of spherical or spheroidal shape.

9. The supported membrane according to claim 1 wherein the diameter of the nanoparticles is 3 nm to 30 nm.

10. The supported membrane according to claim 1 wherein the organic group is selected from the group consisting of pyridine, amines, acetylacetonates, carboxylates and phosphonates.

11. The supported membrane according to claim 1 wherein the membrane consists of at least one metal oxide or metalloid oxide.

12. The supported membrane according to claim 11 wherein said oxide is selected from among $Al_2O_3$, $SiO_2$, $ZrO_2$, $TiO_2$, and mixtures thereof.

13. The supported membrane according to claim 11 wherein the support consists of a material selected from among metal oxides, metalloid oxides, and mixtures thereof; metal carbides, metalloid carbides and mixtures thereof; silicates; metal titanates, metalloid titanates, and mixtures thereof; and mixtures thereof.

14. The supported membrane according to claim 1 wherein the membrane is a microfiltration membrane with a mean pore size of 2 to 0.1 µm, an ultrafiltration membrane with a mean pore size of 1 nm to 100 nm, or a nanofiltration membrane with a mean pore size of less than 1 nm.

15. The supported membrane according to claim 1 wherein the filtration membrane is a planar membrane and the support is a planar support, or the membrane is a tubular membrane and the support is a tubular support.

16. The supported membrane according to claim 1 wherein the support is a block or monolith having the shape of a cylinder of revolution, wherein one or more channel(s) having walls, said walls having an inner face and an outer face, are defined within said support, said channel(s) being of circular or polygonal cross-section, the axis of said one or more channel(s) being parallel to the axis of said cylinder of revolution, the inner face of said channel(s) being coated with an inorganic layer forming one or more tubular filtration membranes.

17. A process for preparing the supported membrane according to claim 1 wherein the following successive steps are carried out:
   a) providing a supported membrane comprising an inorganic solid porous filtration membrane supported on an inorganic solid porous support;
   b) chemically attaching an organic graft on the outer surface of the filtration membrane, inside the pores of the filtration membrane and optionally inside the pores of the support;
   c) contacting the inorganic solid porous filtration membrane to the surface of which and inside the pores of which the organic graft is attached, and the inorganic solid porous support inside the pores of which the organic graft is optionally attached, with a solution containing the $M^{n+}$ ion, and then washing the supported membrane thus obtained one or more times;
   d) contacting the supported membrane obtained at the end of step c) with a solution of a complex of $[M'(CN)_m]^{x-}$;
   e) washing the supported membrane further comprising nanoparticles obtained at the end of step d) one or more times; and
   f) optionally repeating steps c) to e).

18. The process according to claim 17 wherein the chemical attaching of the organic graft to the surface of the filtration membrane, inside the pores of the filtration membrane and optionally inside the pores of the support, is performed by contacting the porous filtration membrane and the porous support with a solution in water or methanol of $_2(EtO)$—$(P=O)$—$(CH_2)_2$—$NH$—$(CH_2)_2$—$NH_2$.

19. The process according to claim 17 wherein the solution containing the $M^{n+}$ ion is a solution, in a solvent selected from among water, alcohols, and mixtures thereof, of one or more salts containing the $M^{n+}$ ion.

20. The process according to claim 17 wherein the complex of $[M'(CN)_m]^{x-}$ meets the following formula: $(Cat)_x[M'(CN)_m]$ and Cat is a cation selected from among cations of alkaline metals, ammoniums, quaternary ammoniums, and phosphoniums.

21. The process according to claim 17 wherein steps c) to e) are repeated 1 to 4 times.

22. A method for separating at least one metal cation and solid particles from a liquid medium containing the same, wherein a stream of liquid medium is contacted with a first face of a supported membrane comprising an inorganic solid porous filtration membrane supported by an inorganic solid porous support, said supported membrane comprising nanoparticles of a metal coordination polymer with CN ligands comprising $M^{n+}$ cations, where M is a transition metal and n is 2 or 3; and $Alk^+_y[M'(CN)_m]^{x-}$ anions, where Alk is an alkaline metal, y is 0, 1, or 2, M' is a transition metal, x is 3 or 4, and m is 6 or 8; said $M^{n+}$ cations of the coordination polymer being bound through an organometallic or coordination bond to an organic group of an organic graft chemically attached to an outer surface of the filtration membrane, inside the pores of the filtration membrane and optionally inside the pores of the support, opposite the support, a pressure difference is applied across the first face of the supported membrane and an opposite second face of the supported membrane, whereby a first portion of the stream of liquid medium passes through the supported membrane, is collected from the second face of the supported membrane and forms a permeate depleted in metal cation and in solid particles; a second portion of the stream of liquid medium does not pass through the supported membrane, is collected from the first face of the supported membrane and forms a retentate enriched in solid particles; and the metal cation is immobilised at the outer surface of the inorganic solid porous filtration membrane, inside the pores of the inorganic solid porous filtration membrane, and optionally inside the pores of the inorganic solid porous support.

23. The method according to claim 22 wherein said liquid medium is an aqueous liquid medium.

24. The method according to claim 22 wherein said liquid medium is selected from among liquids and effluents derived from the nuclear industry and plants and from activities using radionuclides.

25. The method according to claim 22 wherein said cation is present at a concentration of 0.1 picogram to 100 mg/L.

26. The method according to claim 22 wherein the cation is a cation of an element selected from among Cs, Co, Ag, Ru, Fe and Tl and the isotopes thereof.

27. The method according to claim 26 wherein the cation is a cation of $^{134}Cs$, or $^{137}Cs$.

28. The method according to claim 22, wherein the stream of liquid medium is contacted with the first face of the supported membrane, circulating parallel to said first face such that cross-flow filtration of the stream of liquid medium is carried out.

* * * * *